United States Patent
Bhagavatula

[19]

[11] Patent Number: 6,111,674
[45] Date of Patent: Aug. 29, 2000

[54] MULTIPLE REFLECTION MULTIPLEXER AND DEMULTIPLEXER

[75] Inventor: Venkata Adiseshaiah Bhagavatula, Big Flats, N.Y.

[73] Assignee: Corning Incorporated, Corning, N.Y.

[21] Appl. No.: 08/787,460

[22] Filed: Jan. 22, 1997

Related U.S. Application Data

[60] Provisional application No. 60/012,170, Feb. 23, 1996.
[51] Int. Cl.$^7$ ...................................................... H04J 14/02
[52] U.S. Cl. ................................................................ 359/124
[58] Field of Search ..................................... 359/124, 127, 359/157, 900, 115, 130; 385/22, 47, 51, 52, 33, 18, 37, 39, 124, 27, 40, 147, 46–48; 250/227.24; 370/535, 537, 351

[56] References Cited

U.S. PATENT DOCUMENTS

| | | |
|---|---|---|
| 4,329,017 | 5/1982 | Kapany et al. . |
| 4,474,424 | 10/1984 | Wagner . |
| 4,479,697 | 10/1984 | Kapany et al. . |
| 4,484,795 | 11/1984 | Byron . |
| 4,571,024 | 2/1986 | Husbands . |
| 4,652,080 | 3/1987 | Carter et al. . |
| 4,675,860 | 6/1987 | Laude et al. . |
| 4,701,009 | 10/1987 | Tangonan et al. . |
| 4,714,313 | 12/1987 | Kapany et al. . |
| 4,715,027 | 12/1987 | Mahapatra et al. . |
| 4,723,829 | 2/1988 | Koonen . |
| 4,735,478 | 4/1988 | Hily et al. . |
| 4,740,951 | 4/1988 | Lizet et al. . |
| 4,741,588 | 5/1988 | Nicia et al. . |
| 4,746,186 | 5/1988 | Nicia . |
| 4,748,614 | 5/1988 | Dammann et al. . |
| 4,749,247 | 6/1988 | Large . |
| 4,763,969 | 8/1988 | Khoe et al. . |
| 4,773,063 | 9/1988 | Hunsperger et al. . |
| 4,786,133 | 11/1988 | Gidon et al. . |
| 4,800,557 | 1/1989 | Weber . |
| 4,819,224 | 4/1989 | Laude . |
| 4,836,634 | 6/1989 | Laude . |
| 4,838,638 | 6/1989 | Kamiyama et al. . |
| 4,923,271 | 5/1990 | Henry et al. . |
| 4,938,553 | 7/1990 | Maerz et al. . |
| 5,016,967 | 5/1991 | Meltz et al. . |
| 5,026,131 | 6/1991 | Jannson et al. . |
| 5,107,359 | 4/1992 | Ohuchida . |
| 5,140,657 | 8/1992 | Thylén . |
| 5,175,780 | 12/1992 | Sano et al. . |
| 5,195,161 | 3/1993 | Adar et al. . |
| 5,218,654 | 6/1993 | Sauter . |
| 5,228,103 | 7/1993 | Chen et al. . |
| 5,233,187 | 8/1993 | Sakata et al. . |
| 5,245,404 | 9/1993 | Jannson et al. . |
| 5,245,680 | 9/1993 | Sauter . |
| 5,317,655 | 5/1994 | Pan . |
| 5,361,155 | 11/1994 | Chiaroni et al. . |
| 5,371,816 | 12/1994 | Pan . |
| 5,377,286 | 12/1994 | Iida et al. . |
| 5,420,948 | 5/1995 | Byron . |
| 5,450,511 | 9/1995 | Dragone . |
| 5,661,577 | 8/1997 | Jenkins et al. ........................... 359/359 |

OTHER PUBLICATIONS

Principles of Optics, Electromagnetic Theory of Propagation, Interference and Diffraction of Light, by Max Born and Emil Wolf, et al., Pergamon Press, Oxford, Fifth Edition, 1975, 4 pages.

(List continued on next page.)

*Primary Examiner*—Dang Ton
*Attorney, Agent, or Firm*—Eugene Stephens & Associates

[57] ABSTRACT

Optical signals are dispersed according to their wavelength by an optical path length difference generator that couples a single pathway conveying a plurality of different wavelength signals to multiple pathways separately conveying the different wavelength signals. The optical path length generator can be formed by a reflective stack having a plurality of partially reflective surfaces for reflecting successive portions of the energy of each of the different wavelength signals along different length optical paths.

72 Claims, 4 Drawing Sheets

OTHER PUBLICATIONS

Pigtailed High–Finesse Tunable Fibre Fabry–Perot Interferometers with Large, Medium and Small Free Spectral Ranges, by J. Stone and L.W. Stulz, Electronics Letters, vol. 23, No. 15, Jul. 16, 1987, 4 pages.

Integrated Optics N +N Multiplexer on Silicon, by C. Dragone, C.A. Edwards, and R.C. Kistler, IEEE Photonics Technology Letters, vol. 3, No. 10, Oct. 1991, pp. 896–899.

Spectrometer on Chip: a Monolithic WDM Component, by J.B.D. Soole, A. Scherer, H.P. LeBlanc, R. Bhat, M.A. Koza, OfC '92 Technical Digest, p. 123.

A Precompetitive Consortium on Wide–Band All–Optical Networks, by Stephen B. Alexander et al., Journal of Lightwave Technology, vol. 11, No. 5/6, May/Jun. 1993, pp. 714–735.

All–Optical Packet–Switched Metropolitan–Area Network Proposal, by Paul E. Green, Jr. et al., Journal of Lightwave Technology, vol. 11, No. 5/6, May/Jun. 1993, pp. 754–763.

Split–Beam Fourier Filter and its Application in a Gain–Flattened EDFA, by R.A. Betts, S.J. Frisken, D. Wong, Ofc '95 Technical Digest, vol. B, 1995 Technical Digest Series, Feb. 26 –Mar. 3, 1995, Conference Edition, 3 pages.

Large Angular–Dispersion by Virtually–Imaged Phased–Array (VIPA) and its Application to Wavelength Demultiplexing, by M. Shirasaki, Moc '95 Hiroshima, PD3, pp. 10–13.

"Weakly Guiding Fibers" by D. Gloge, Applied Optics, vol. 10, No. 10, Oct. 1971, pp. 2252–2258.

"Anumerical Technique for the Determination of Propagation Characteristics of Inhomogeneous Planar Optical Waveguides" by J.P. Meunier et al., Optical and Quantum Electronics 15 (19/83), pp. 77–85.

Miki, Tetsuya and Ishio, Hideki. "Vialbilities of the Wavelength–Division–Multiplexing Transmission System Over and Optical Fiber Cable." *IEEE Transactions on Communications*, vol. COM–26, No. 7 Jul. 1978. pp. 1082–1087.

Tomlinson, W.J. "Wavelength multiplexing in multimode optical fibers." APPLIED OPTICS, vol. 16 No. 8 Aug. 1977. pp. 2180–2194.

MULTIPLE REFLECTION MULTIPLEXER AND DEMULTIPLEXER

This application claims the benefit under 35 USC §119(e) of U.S. Provisional Application Ser. No. 60/012,170, filed Feb. 23, 1996.

TECHNICAL FIELD

The invention relates to multiplexers and demultiplexers that use variations in optical path length to route optical signals according to their wavelength.

BACKGROUND

Generally, the same devices can be used for both multiplexing and demultiplexing operations. The difference is merely the result of opposite directions of light travel through the devices. Multiplexers route signals of different wavelengths (also referred to as channels) traveling in multiple optical pathways into a single pathway. Demultiplexers route different wavelength signals from a single pathway into respective multiple pathways.

A variety of techniques are used within these devices to distinguish the different wavelength signals. One such technique involves varying optical path lengths of intermediate pathways between the single and multiple pathways to angularly separate different wavelength signals. Waveguides of varying length are arranged in a lateral progression to relatively vary phases of the different wavelength signals transverse to their direction of propagation. Generally, the path length differences are an integer multiple of a central wavelength signal, whose wavefront is not affected by the different distances of travel; but the remaining wavelength signals progressively vary in inclination as a function of their wavelength. For example, the wavefront of the wavelength that differs most from the central wavelength is also the most inclined.

In the demultiplexing direction, the different wavelength signals enter the different length intermediate pathways as parallel wavefronts and exit the intermediate pathways as relatively inclined wavefronts. The entrance and exit are reversed for multiplexing operations. Focusing is used to convert the angular separation between wavefronts into a linear separation coincident with a lateral array of the multiple pathways.

Each of the different wavelength signals entering the devices exhibits a mode field that can be defined by a pattern of radiation in a plane transverse to the direction of propagation. Ordinarily, the pattern follows a Gaussian-type distribution. The intermediate pathways individually convey different sections of the mode fields of each signal; but collectively, the intermediate pathways preserve the overall distribution of energy in the original mode fields (i.e., the peak intensities in the intermediate pathways follow a pattern that matches the distribution of energy in the original mode fields).

However, such distributions are not well suited for efficiently coupling the inclined wavefronts to the laterally arrayed multiple pathways. The different wavelength signals having inclined wavefronts are also effectively inclined to the direction of propagation and focus at positions that are correspondingly offset from the focus position of a non-inclined wavefront. As a result, transmission efficiency tends to decrease with increasing amounts of wavefront inclination. That is, the central wavelength signal couples most efficiently; but other wavelength signals exhibit greater losses, especially those wavelength signals most remote from the central wavelength signal.

SUMMARY OF INVENTION

My invention in one or more of its various embodiments improves coupling efficiency of multiplexers and demultiplexers by controlling distributions of energy independently of the individual mode field distributions of different wavelength signals. Optical path length differences are still used to angularly distinguish the different wavelength signals, but the distribution of energy across the different length optical paths does not match the mode field distributions of the signals.

Instead of dividing up the mode fields into different sections and conveying different sections, the different length pathways of my invention can be arranged to collect successive portions of the energy throughout the mode fields. In other words, each of the different length pathways of my invention includes energy drawn from a sampling of different positions in the mode field of each of the different wavelength signals.

One embodiment of my new multiplexing and demultiplexing apparatus is preferably of a type that couples a single pathway for conveying a plurality of different wavelength signals with multiple pathways for separately conveying the different wavelength signals using an optical path length difference generator having a plurality of different length intermediate pathways. However, in contrast to conventional optical path length difference generators, a compound beamsplitter within my optical path length difference generator:

(a) diverts a portion of the energy from multiple locations in the mode field of each of the different wavelength signals along one of the different length intermediate pathways, (b) diverts a portion of the remaining energy from multiple locations in the mode field of each of the different wavelength signals along another of the different length intermediate pathways, and (c) continues to divert succeeding portions of the remaining energy from multiple locations in the mode field of each of the different wavelength signals along other of the different length intermediate pathways until substantially all of the energy of each of the different wavelength signals is successively diverted along the other different length intermediate pathways.

The different length intermediate pathways are arranged in a pattern for angularly separating the different wavelength signals. A separate focusing optic can be used to couple the angularly separated wavelength signals to the multiple pathways.

The amount of energy in each intermediate pathway is controlled by the amount of energy diverted into the intermediate pathway from the multiple locations in the mode field of each different wavelength signal rather than from a single location in the mode field. This new control over the distribution of energy among the intermediate pathways can be used to provide more uniform coupling efficiencies among the different wavelength signals. The optical path length difference generator including the compound beamsplitter can be formed as a reflective stack having a plurality of overlapping partially reflective surfaces for coupling the single and multiple pathways. Each of the partially reflective surfaces is oriented for reflecting a portion of the energy of each of the different wavelength signals at a non-zero angle of reflection and is relatively positioned for varying optical path lengths between the single and multiple pathways transverse to a direction of propagation between them.

For example, a first of the partially reflective surfaces reflects a portion of the energy of each of the different wavelength signals along a first of the different length intermediate pathways and transmits the remaining portion of the energy of each of the different wavelength signals to a second of the partially reflective surfaces. A second of the partially reflective surfaces reflects a portion of the remaining energy of each of the different wavelength signals along a second of the different length intermediate pathways and transmits the further remaining portion of the energy of each of the different wavelength signals to a third and subsequent partially reflective surfaces until substantially all of the energy of each of the different wavelength signals is divided among additional intermediate pathways.

The partially reflective surfaces of the stack can be formed either by alternating layers having different refractive indices or by alternating transmissive and partially reflective layers, such as quarter-wave reflective films. Preferably, the partially reflective surfaces are parallel and substantially equally spaced. The amounts of energy distributed among the intermediate pathways are controlled by the amounts of reflectivity exhibited by the partially reflective surfaces. The optical path length differences between the partially reflective surfaces are controlled by the non-zero angle of reflection from the partially reflective surfaces, the spacing between the partially reflective surfaces, and the refractive indices of the conveying mediums.

DRAWINGS

Figure 3:
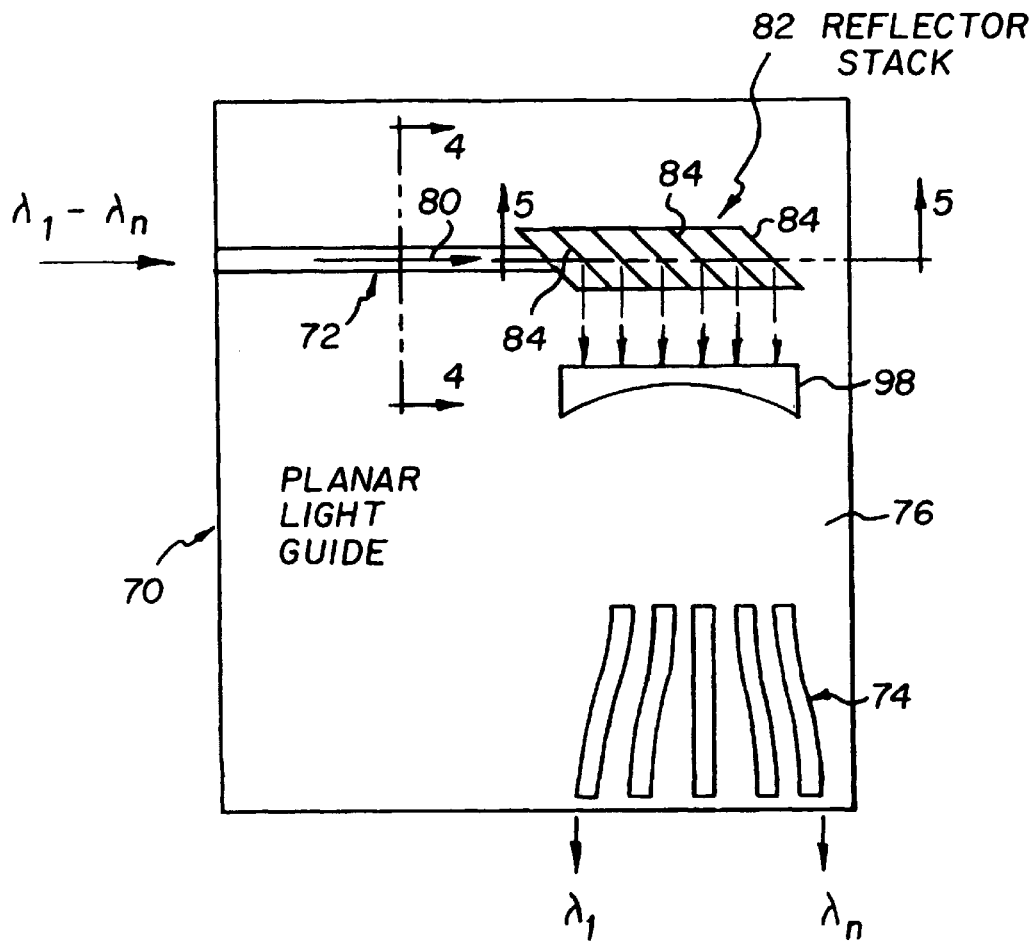
FIG. 3 is a plan view of an integrated optical implementation of my new multiplexer and demultiplexer.
Figure 5A:
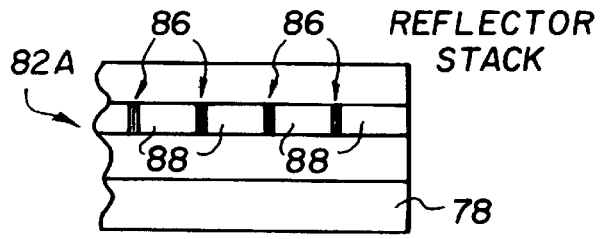
Figure 5B:
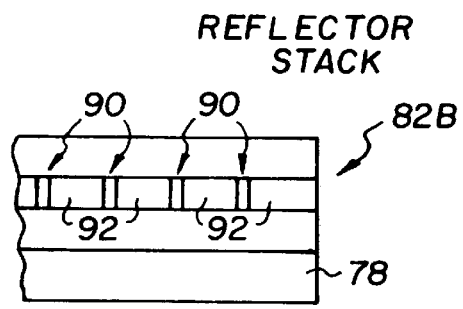
Figure 5C:
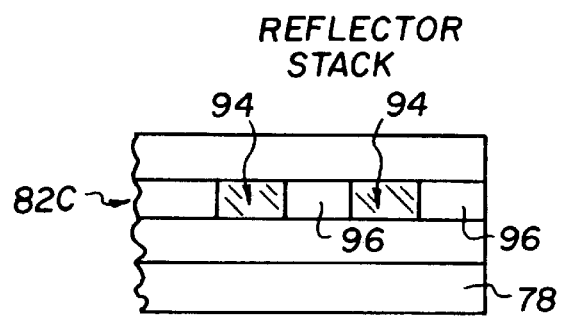

FIGS. 5A, 5B, and 5C are cross-sectional views along line 5—5 of FIG. 3 showing alternative structures for forming an optical path length difference generator.

Figure 6:
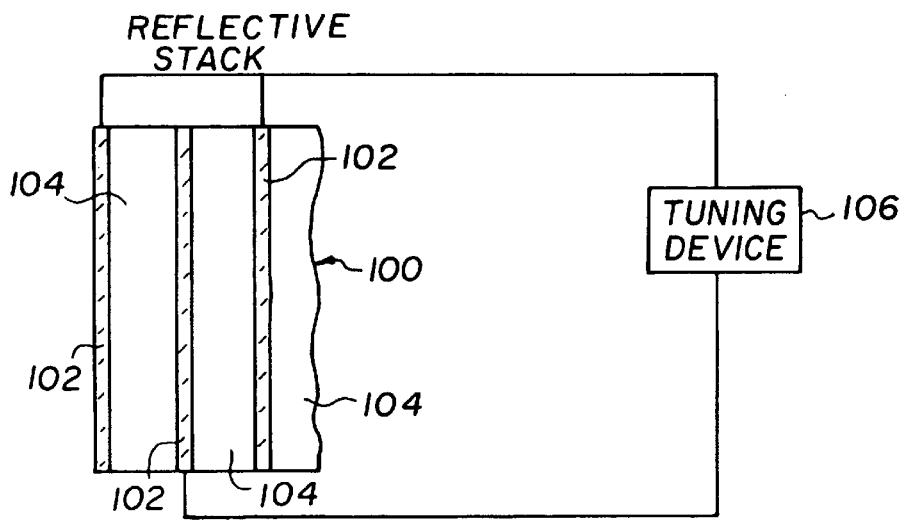

FIG. 6 is a cut-away plan view of a tunable reflective stack.

DETAILED DESCRIPTION

Figure 1:
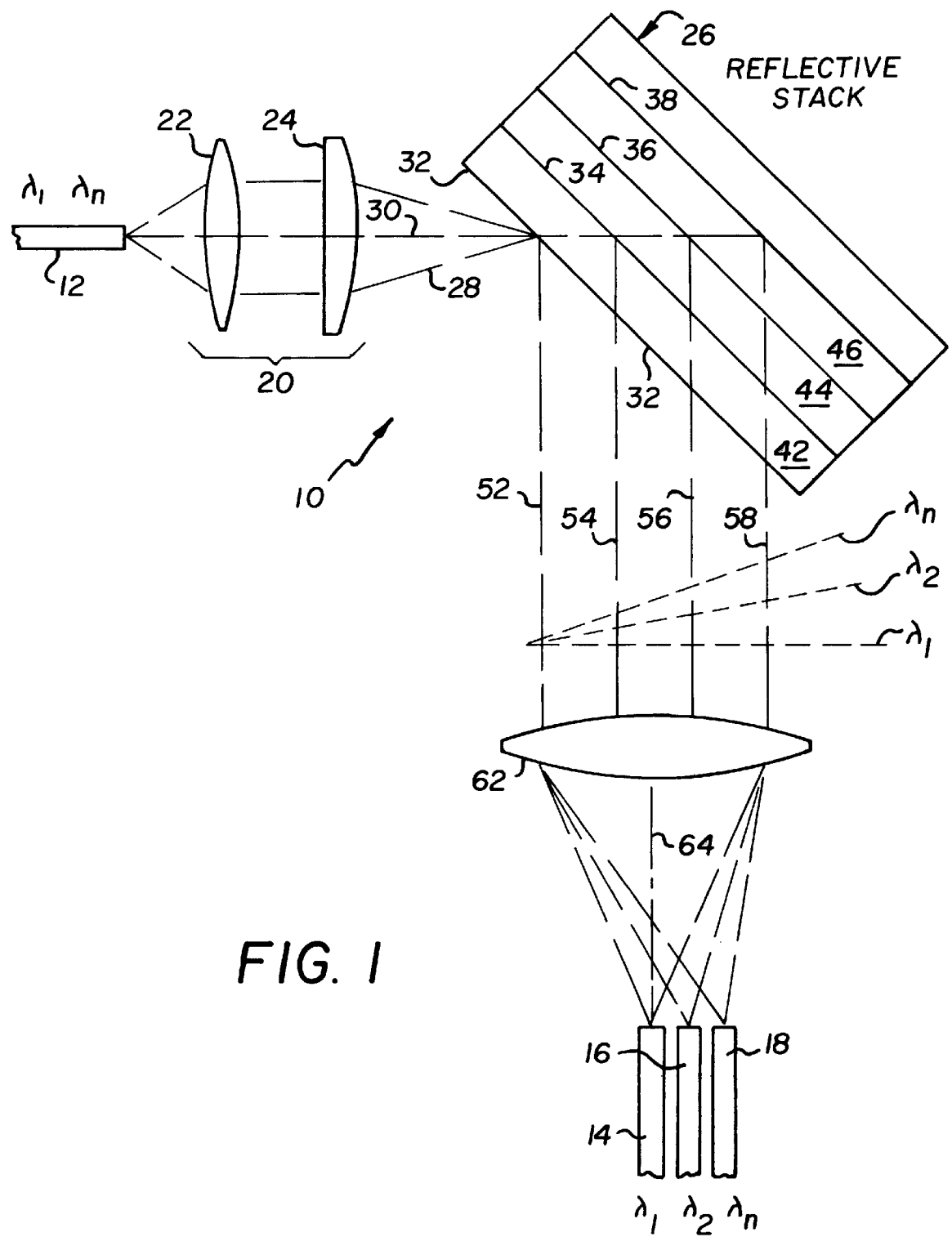
FIG. 1 is a layout of a bulk optical implementation of my new multiplexer and demultiplexer.

In a bulk optical implementation 10 of my new multiplexer and demultiplexer depicted in FIG. 1, a single pathway 12 for conveying different wavelength signals "$\lambda_1$–$\lambda_n$" and multiple pathways 14, 16, and 18 for separately conveying the same signals are single-mode optical fibers. During demultiplexing operations, the single pathway 12 is an input pathway and the multiple pathways 14, 16, and 18 are output pathways. The input and output is reversed during multiplexing operations. For simplicity, the further components of my new multiplexer and demultiplexer are referenced with respect to a direction of light travel for demultiplexing operations.

A beam-shaping assembly 20, including a collimating lens 22 and a cylindrical lens 24, couples the single pathway 12 to a reflective stack 26, which functions as a multi-stage optical path length difference generator. The different wavelength signals "$\lambda_1$–$\lambda_n$" are received by the reflective stack 26 as a narrow-waisted beam 28 having a plurality of parallel wavefronts propagating along a common linear pathway 30, each having a given amount of energy distributed throughout a mode field.

The reflective stack 26 includes a plurality of partially reflective surfaces 32, 34, 36, and 38 that overlap along the common pathway 30. The partially reflective surfaces 32, 34, 36, and 38 are preferably formed by a thin reflective film, such as a quarter-wave film of high refractive index or air. Layers of materials alternating between high and low refractive indices could also be used. Although only 4 partially reflective surfaces are depicted in FIG. 1, 20 or more such partially reflective surfaces may be needed to achieve desired coupling efficiency and cross-talk attenuation.

Each of the partially reflective surfaces 32, 34, and 36 functions as a two-way beamsplitter by reflecting a portion of the energy from multiple locations in the mode field (e.g. throughout the mode field) of each of the different wavelength signals "$\lambda_1$–$\lambda_n$" and by transmitting a remaining portion of the energy of each of the different wavelength signals "$\lambda_1$–$\lambda_n$" to a succeeding one of the partially reflective surfaces 34, 36, and 38. Although the reflected portion of the energy is preferably drawn uniformly from throughout the mode field, the partially reflective surfaces 32, 34, and 36 could also be formed with discrete areas of higher reflectivity for drawing the energy from a plurality of locations in the mode field. In the latter case, the discrete areas would preferably be staggered between partially reflective layers so that the entire mode field is eventually reflected. Transmissive layers 42, 44, and 46 convey the different wavelength signals "$\lambda_1$–$\lambda_n$" between the partially reflective surfaces 32, 34, 36, and 38. The last partially reflective surface 38 along the common pathway 30 can also be made fully reflective to maximize coupling efficiency.

Figure 2:
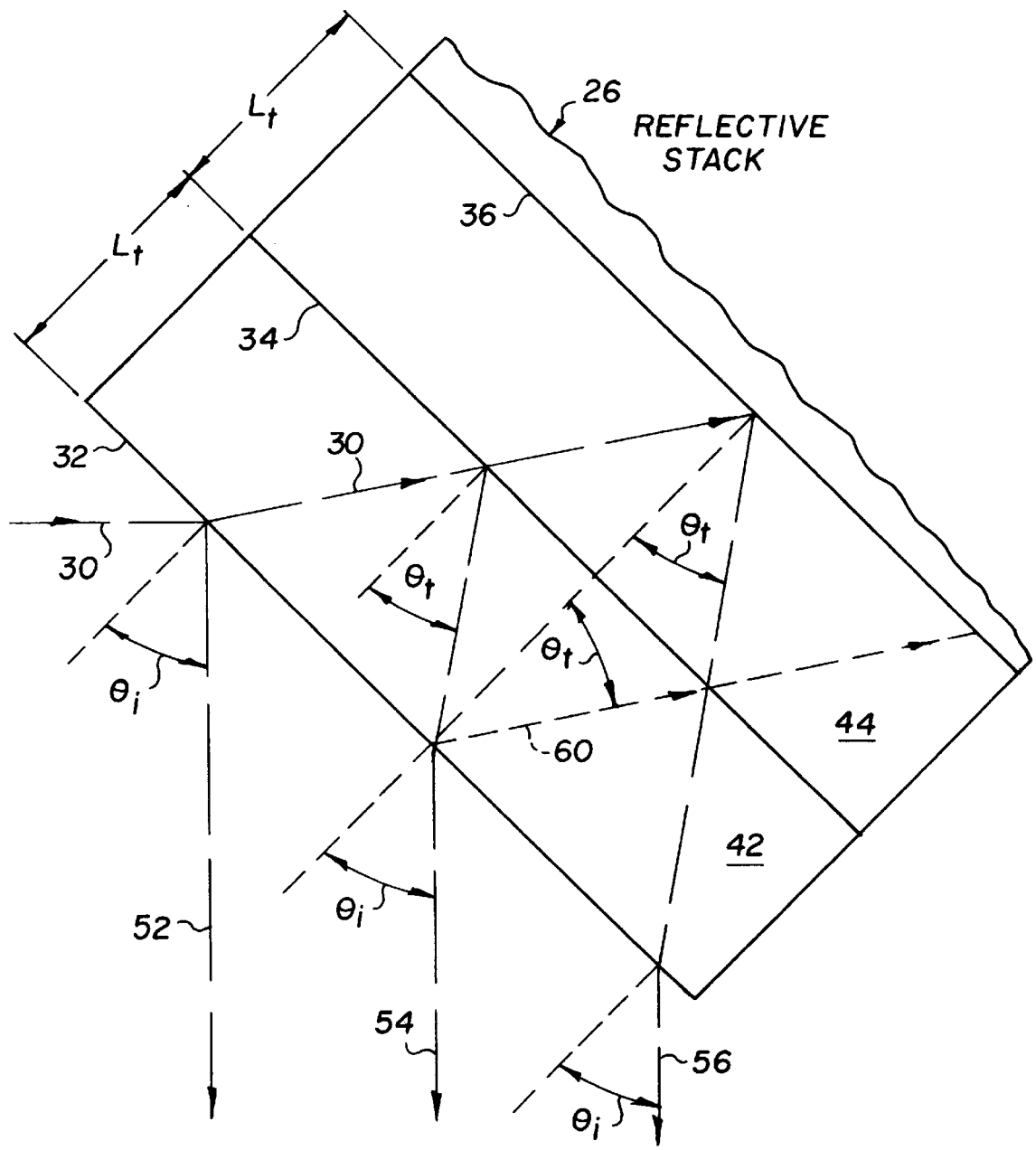
FIG. 2 is a partial view of a reflective stack used in my multiplexer and demultiplexer as an optical path length difference generator.

With reference to FIG. 2, the partially reflective surface 32 reflects a portion of the energy of each of the different wavelength signals "$\lambda_1$–$\lambda_n$" from the common pathway 30 to an intermediate pathway 52 at an angle of reflection $\theta_i$ and transmits the remaining energy along the common pathway 30 to the partially reflective surface 34. A portion of the remaining energy is reflected by the partially reflective surface 34 from the common pathway 30 to an intermediate pathway 54 at an angle of reflection "$\theta_i$", and the rest of the energy is transmitted by the partially reflective surface 34 to the next partially reflective surface 36. Again, the next partially reflective surface 36 reflects one portion and transmits another portion of the incident energy. The reflected portion is diverted from the common pathway 30 to an intermediate pathway 56. The transmitted portion is conveyed to similar succeeding partially reflective surfaces (e.g., reflective surface 38) until substantially all of the energy of the different wavelength signals "$\lambda_1$–$\lambda_n$" is diverted from the common pathway 30 to additional intermediate pathways (e.g., intermediate pathway 58).

The partially reflective surfaces 32, 34, 36, and 38 are oriented parallel to each other and are spaced apart at an approximately constant distance "$L_t$". The angle of reflection "$\theta_i$" from the reflective stack 26 is depicted at approximately 45 degrees for ease of illustration, but the angle "$\theta_i$" is preferably selected to avoid proximity to Brewster's angle, such as within a range of approximately 5 degrees to 15 degrees, so that the reflectivity of the partially reflective surface 32 is not polarization dependent. The angle of reflection "$\theta_t$" from within the reflective stack 26 differs from the angle of reflection "$\theta_i$" by an amount of refraction at the interface of the outermost partially reflective surface 32. The two angles "$\theta_i$ and $\theta_t$" can be numerically related as follows:

$$n_i \sin \theta_i = n_t \sin \theta_t$$

where "$n_i$" is the refractive index of a transmissive medium adjacent to the outermost partially reflective surface 32 of the stack 26 and "$n_t$" is the refractive index of the transmissive layer 42.

The successive reflections of the partially reflective surfaces 32, 34, 36, and 38 divide the energy of the different wavelength signals "$\lambda_1$–$\lambda_n$" among the intermediate pathways 52, 54, 56, and 58 without regard to the distribution of energy in the mode fields of the different wavelength signals "$\lambda_1$–$\lambda_n$". The distribution of energy among the intermediate pathways 52, 54, 56, and 58 can be controlled by adjusting the amounts of reflectivity exhibited by the partially reflective surfaces 32, 34, 36, and 38. For example, the partially reflective surfaces 32, 34, 36, and 38 can be made to progressively increase in percent reflectivity to compensate for the exponentially decreasing amounts of energy reaching the subsequent partially reflective surfaces 34, 36, and 38.

When calculating the desired reflectivities, re-reflections must also be considered. For example, FIG. 2 shows a portion of the energy reflected from the partially reflective layer 34 being returned along an interim pathway 60 to the partially reflective layer 34 by a partial reflection from the partially reflective surface 32. An even lesser portion is re-reflected by the partially reflective layer 34 along the intermediate pathway 56 in alignment with reflections from the partially reflective surface 36. The rest of the energy returned along interim pathway 60 is transmitted to the succeeding partially reflective layers 36 and 38 for diversion along the remaining intermediate pathways (e.g., pathway 58).

The intermediate pathways 52, 54, 56, and 58 vary in optical path length as a function of the spacing "$L_t$" between two adjacent partially reflective layers, the refractive index "$n_t$" of the middle transmissive layer, and an angle of reflection "$\theta_t$" from the two partially reflective layers in accordance with the following equation:

$$\delta\rho = 2L_t\, n_t \cos \theta_t$$

where "$\delta\rho$" is a difference between the optical path lengths of adjacent intermediate pathways 52, 54, 56, and 58.

The optical path length difference "$\delta\rho$" is preferably selected as an integer multiple "m" of a central wavelength "$\lambda_0$" corresponding, for example, to the wavelength of the signal "$\lambda_1$" shown in FIG. 1. All other non-integer multiple wavelengths vary in phase as a result of the optical path length difference "$\delta\rho$". The multiple "m" is preferably within the range of 20 to 150 to enhance phase changes between the different wavelength signals. The useful wavelength range of the device, i.e., the free spectral range "FSR", is also related to the integer multiple "m" as follows:

$$FSR = \frac{\lambda_0}{m}$$

The path length differences "$\delta\rho$" along the intermediate pathways 52, 54, 56, and 58 combined with a lateral spacing between these intermediate pathways create an angular dispersion between the different wavelength signals as shown in FIG. 1. Expressed numerically in radians per unit of wavelength, the angular dispersion "$d\theta_i/d\lambda$" between two different wavelength signals can be approximated as follows:

$$\frac{d\theta_i}{d\lambda} \cong \frac{-n_t \cot \theta_t}{n_i \lambda}$$

The angular dispersion "$d\theta_i/d\lambda$" between the wavelengths can be constant across all of the adjacent intermediate pathways 52, 54, 56, and 58 for making a first order change in inclination between the different wavelength signals "$\lambda_1$–$\lambda_n$", or the angular dispersion "$d\theta_i/d\lambda$" can be varied transverse to the direction of propagation to produce higher order effects on wavefront shape. For example, wavefront curvature could be used for focusing.

Thus, together with the capacity to vary the number, position, and reflectivity of the partially reflective surfaces 32, 34, 36, and 38, the variables that contribute to the path length difference "$\delta\rho$" and to the angular dispersion "$d\theta_i/d\lambda$" can be controlled to influence both the relative angularity and shape of the respective wavefronts of the different wavelength signals "$\lambda_1$–$\lambda_n$", as well as the mode field distribution of energy collectively conveyed by the different wavelength signals "$\lambda_1$–$\lambda_n$". Ordinarily, uniform coupling efficiencies and lower cross-talk between adjacent signals are the primary goals of such optimization.

A focusing optic 62 couples the angularly inclined signals "$\lambda_1$–$\lambda_n$" between the reflective stack 26 and the multiple pathways 14, 16, and 18. As drawn, the non-inclined wavefront of the signal "$\lambda_1$" of FIG. 1, which is an even multiple "m" of the optical path length differences "$\delta\rho$", is focused along the optical axis 64 on the pathway 14. The remaining signals "$\lambda_2$ and $\lambda_n$" are focused on pathways 16 and 18 at increasing offsets from the optical axis 64 in accordance with their relative amounts of inclination. Additional pathways can be located on either side of the optical axis 64 to convey other wavelength signals requiring multiplexing or demultiplexing.

Figure 4:
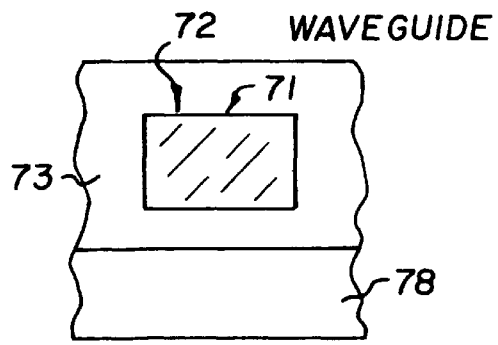
FIG. 4 is a cross-sectional view along line 4—4 of FIG. 3 showing a microchannel waveguide.

A planar implementation 70 of my new multiplexer and demultiplexer is shown in FIG. 3. A single pathway 72 and multiple pathways 74 are formed as microchannel waveguides in a planar light guide 76. FIG. 4, which is taken along line 4—4, shows the single waveguide 72 formed by a core portion 71 and a surrounding cladding portion 73 on a substrate 78.

The single waveguide 72 conveys the different wavelength signals "$\lambda_1$–$\lambda_n$" as a narrow beam of light 80 directly to a reflector stack 82 having a plurality of partially reflective surfaces 84 oriented parallel to each other but inclined to a non-zero angle of reflection for the beam 80. The partially reflective surfaces 84 function as a compound beamsplitter similar to the corresponding surfaces of the preceding implementation 10.

FIGS. 5A, 5B, and 5C, which are taken along line 5—5, illustrate three alternative structures of the reflector stack 82, designated 82A, 82B, and 82C. In FIG. 5A, the reflective stack 82A is formed by a plurality of thin reflective films 86 separated by transmissive elements 88, which can be made of the same or different materials from the waveguides. The reflective films 86 function as the partially reflective surfaces 84. The transmissive elements 88 function as transmissive substrates measuring approximately 20 μm to 1000 μm in thickness for supporting the much thinner reflective films 86 measuring only about one-quarter wavelength in thickness (approximately 500 Å–2000 Å).

The transmissive elements 88 can be formed from a number of different types of materials including glasses, polymers, semiconductors, and electro-optical materials. Exemplary glass materials are $SiO_2$, soda lime glass, doped silica, $TiO_2$, $GeO_2$, $Al_2O_3$, as well as other oxide or sulfide glasses. The polymers, which can be UV curable, thermoplastic, or thermosetting materials, include polycarbonate, polyimide, and PMMA. The semiconductors include Si, Ge, InP, and GaAs.

A wide choice of materials is also available for the reflective films 86 including some of the same materials listed for the transmissive elements 88. In addition to being partially reflective, the reflective films 86 are also partially transmissive. In fact, the reflective films 86 are preferably more than 95% transmissive so that only a small percentage of the energy of the different wavelength signals "$\lambda_1 - \lambda_n$" is reflected by each reflective film 86.

For example, the reflective films 86 can be made from various oxide, sulfide, nitride, and fluoride materials such as $Si_3N_4$, silicon oxynitride, $MgF_2$, $PbF_2$, and ZnS. Other transparent polymers, liquid crystals, and electro-optic materials can also be used including such materials that can be deposited by sputtering, conventional or electron-beam evaporation, and plasma or chemical vapor deposition. Transparent electrode materials such as aluminum-doped ZnO or indium tinoxide can also be used.

Some of these materials for forming the reflective films 86 and the transmissive elements 88 are more suitable for bulk optical applications such as for making the reflector stack 26 of the preceding implementation 10, and others are more suitable for the reflector stack 82 of the present implementation 70. The choice of materials also depends on the optical characteristics of the materials within the range of wavelengths (e.g., 1000 nm to 1700 nm) considered for transmission through the reflector stack. Also, both the reflective films 86 and the transmissive elements 88 should exhibit low absorptance to maximize efficiency.

The reflector stack 82B of FIG. 5B is similar except that air gaps 90 between transmissive elements 92 replace the thin reflective films. Due to an index variation at interfaces between the air gaps 90 and the transmissive elements 92, the interfaces function as the partially reflective surfaces 84. Since the refractive index of air is fixed, the amounts of reflection from each interface is controlled by adjusting the refractive indices of the transmissive elements 92.

Index variation is also used in the reflector stack 82C of FIG. 5C to produce the partially reflective surfaces 84. The stack 82C is made by alternating layers 94 and 96 of different refractive indices (i.e., low and high refractive indices). The interfaces between the layers 94 and 96 provide partial reflectivity as a function of the differences between the refractive indices.

Again, some of the same materials, including those listed for the transmissive elements 88 or the reflective film 86, can be used for the alternating layers 94 and 96 of low and high refractive indices. Examples of low index materials include various glasses such as $SiO_2$, $B_2O_3$ doped $SiO_2$, flumined doped $SiO_2$, and $Na_3AlF_6$ as well as polymers such as PMMA and silicones. High index glasses include $Si_3N_4$, $TiO2$, $GeO_2$, ZnS, $PbF_2$, and Si. Polymers with suitably high indices include polycarbonate, polyimide, and photoresist materials.

Similar to the implementation 10, the mode field emerging from the reflective stack 82 is determined largely by the relative reflectivities and positions of the partially reflective surfaces 84. The angular dispersion of the different wavelength signals "$\lambda_1 - \lambda_n$" is further determined by the different refractive indices of the transmissive layers (e.g., 88) and the angles of reflection from the partially reflective surfaces 84.

A focusing lens 98 (FIG. 3) converts the angular separation between the different wavelength signals "$\lambda_1 - \lambda_n$" into a spatial separation corresponding to the positions of the multiple waveguides 74. In other words, each of the different wavelength signals "$\lambda_1 - \lambda_n$" is focused on a different one of the multiple waveguides 74. A gradual fanning of the multiple waveguides 74 is used for connection to larger optical fibers, which are not shown.

In addition to the bulk and integrated planar implementations 10 and 70, my new multiplexer and demultiplexer can be assembled from hybrid optics. For example, the single and multiple pathways can be implemented on a planar light guide and either the optical path length difference generator or the focusing optic can be separately made and coupled to the planar light guide. One way of separately making a reflective stack with enhanced uniformity between layers is to (a) treat one surface of a plate of transmissive material for forming a partially reflective surface, (b) dice the plate into sections, and (c) assemble the sections into an overlapping stack.

Regardless of whether the implementation is bulk, integrated, or hybrid optics, manufacture to precise tolerances required for routing closely spaced wavelength signals (e.g., differing by 1 nm or less) can be difficult. As a result, some subsequent "tuning" may be necessary. Tuning can be accomplished by using one or more materials in the optical path length difference generator that varies in index, size, or reflectivity in response to local conditions such as temperature, pressure, or electrical or magnetic fields.

For example, FIG. 6 shows an example of a tunable reflective stack 100 having reflective film layers 102 separated by transmissive substrate layers 104. The reflective film layers 102 are made from a transparent conductive material such as ITO, and the transmissive substrate layers 104 are made from a single crystal of pure or doped silicon. A voltage generated by a tuning device 106 and applied across the reflective layers 102 of conducting material changes the refractive index of the transmissive layers 104 for varying the optical path lengths between the reflective layers 102.

The physical spacing "$L_t$" between the reflective layers 102 could be changed by substituting a piezoelectric crystal (such as polyvinylidene fluoride) for the silicon crystal of the transmissive layer 104. A similarly applied voltage could be used to expand or contract the piezoelectric crystal in the direction of the physical spacing "$L_t$". Voltages across electro-optic reflective layers can also be used to control the reflective characteristics of the layers. In addition, the tuning device 106 can be modified to control the temperature, pressure, or electrical or magnetic fields in the vicinity of other transmissive and reflective layers that react similarly to such influences.

I claim:

1. Apparatus for routing optical signals according to their wavelength comprising:

a single pathway that conveys a plurality of different wavelength signals each having a given amount of energy distributed throughout a mode field;

multiple pathways that separately convey the different wavelength signals;

an optical path length difference generator having a plurality of different length intermediate pathways for coupling said single and multiple pathways; and said optical path length generator including a compound beamsplitter that:

(a) diverts a portion of the energy from multiple locations in the mode field of each of the different wavelength signals along one of the different length intermediate pathways, (b) diverts a portion of the remaining energy from multiple locations in the mode field of each of the different wavelength signals along another of the different length intermediate pathways, and (c) continues to divert succeeding portions of a remaining energy from multiple locations in the mode field of each of the different wavelength signals along other of the different length intermediate pathways until substantially all of the energy of each of the different wavelength signals is successively diverted along the other different length intermediate pathways.

2. The apparatus of claim 1 in which said different length intermediate pathways are arranged in a pattern for angularly separating the different wavelength signals.

3. The apparatus of claim 2 further comprising a focusing optic that couples the angularly separated wavelength signals between said different length intermediate pathways and said multiple pathways.

4. The apparatus of claim 3 further comprising a focusing optic that couples the different wavelength signals between said different length intermediate pathways and said single pathway.

5. The apparatus of claim 3 in which said compound beamsplitter controls the distribution of energy among the different length intermediate pathways independently of the mode fields of the different wavelength signals.

6. The apparatus of claim 5 in which said compound beamsplitter distributes the energy of each of the different wavelength signals approximately equally between the different length intermediate pathways.

7. The apparatus of claim 1 in which said compound beamsplitter of the optical path length generator includes a plurality of partially reflective surfaces.

8. The apparatus of claim 7 in which a first of said partially reflective surfaces reflects a portion of the energy of each of the different wavelength signals along a first of the different length intermediate pathways and transmits the remaining portion of the energy of each of the different wavelength signals to a second of said partially reflective surfaces.

9. The apparatus of claim 8 in which said second partially reflective surface reflects a portion of the remaining energy of each of the different wavelength signals along a second of the different length intermediate pathways and transmits the further remaining portion of the energy of each of the different wavelength signals to a third of said partially reflective surfaces.

10. The apparatus of claim 9 in which said compound beamsplitter includes at least 20 of said partially reflective surfaces.

11. The apparatus of claim 9 in which said partially reflective surfaces are arranged in parallel.

12. The apparatus of claim 11 in which said partially reflective surfaces are spaced apart through a distance that is equal to a multiple of the wavelengths of the different wavelength signals.

13. The apparatus of claim 11 in which said partially reflective surfaces are spaced apart through a distance of at least 20 $\mu$m.

14. The apparatus of claim 9 in which said third partially reflective surface reflects a portion of the further remaining energy of each of the different wavelength signals along a third of the different length intermediate pathways.

15. The apparatus of claim 14 in which said first, second, and third partially reflective surfaces are relatively positioned so that a portion of the energy reflected by said second partially reflective surface is reflected by said first partially reflective surface back to said second partially reflective surface where a further diminished portion is re-reflected by said second partially reflective surface along said third intermediate pathway.

16. The apparatus of claim 15 in which optical path lengths along said third intermediate pathway formed by said reflections from said third partially reflective surface and said re-reflections from said second partially reflective surface are substantially equal.

17. An optical multiplexer or demultiplexer device comprising:

a single pathway for conveying a plurality of different wavelength signals each having a given amount of energy;

multiple pathways for separately conveying the different wavelength signals;

a reflective stack having a plurality of overlapping partially reflective surfaces for coupling said single and multiple pathways; and each of said partially reflective surfaces being oriented for reflecting a portion of the energy of each of the different wavelength signals at a non-zero angle of reflection and being relatively positioned for transmitting a remaining portion of the energy of each of the different wavelength signals to another of said partially reflective surfaces for varying optical path lengths between said single and multiple pathways transverse to a direction of propagation between said single and multiple pathways.

18. The device of claim 17 in which said reflective stack is formed by alternating layers having different refractive indices.

19. The device of claim 18 in which one of said alternating layers is air.

20. The device of claim 18 in which both said layers exhibit low absorptance.

21. The device of claim 17 in which said reflective stack is formed by alternating transmissive and partially reflective layers.

22. The device of claim 21 further comprising a tuner for varying a refractive index of one of said transmissive and partially reflecting layers.

23. The device of claim 22 in which one of said layers is made from an electro-optic material.

24. The device of claim 23 in which the other of said layers is made from a conductive material.

25. The device of claim 21 further comprising a tuner for varying a spacing between the partially reflective layers.

26. The device of claim 25 in which one of said layers is made from a piezoelectric material.

27. The device of claim 26 in which the other of said layers is made from a conductive material.

28. The device of claim 21 in which said partially reflective layer is a reflective film.

29. The device of claim 17 in which said reflective stack further comprises a fully reflective layer that reflects the remaining portion of the energy of each of the different wavelength signals at a non-zero angle of reflection.

30. The device of claim 17 in which said partially reflective surfaces extend parallel to each other.

31. The device of claim 30 in which said partially reflective surfaces are substantially equidistantly spaced.

32. The device of claim 31 in which said partially reflective surfaces are separated by transmissive layers.

33. The device of claim 32 in which said transmissive layers are made of substantially the same optical material.

34. The device of claim 17 in which an adjacent pair of said partially reflective surfaces is spaced apart through a distance "$L_t$" and a transmissive layer between said adjacent partially reflective surfaces has an index of refraction "$n_t$".

35. The device of claim 34 in which an optical path length difference "$\delta\rho$" between said adjacent partially reflective surfaces can be calculated as follows:

$$\delta\rho = 2L_t\, n_t\, \cos\theta_t$$

where "$\theta_t$" is an angle of reflection from said adjacent partially reflective surface within the reflective stack.

36. The device of claim 35 in which said distance "$L_t$" is equal to at least 20 $\mu$m.

37. The device of claim 35 in which said angle "$\theta_t$" is between approximately 5 degrees and 15 degrees.

38. The device of claim 17 in which each of said partially reflective surfaces reflects a portion of the energy of each of the different wavelength signals along one of a plurality of different length intermediate pathways between said single and multiple pathways.

39. The device of claim 38 in which the partial reflectivity of each of the partially reflective surfaces is controlled to divide the energy of each of the different wavelength signals approximately equally between said different length intermediate pathways.

40. The device of claim 17 in which each of said partially reflective surfaces successively reflects one portion of the energy of each of the different wavelength signals along one of a plurality of different length intermediate pathways and transmits a remaining portion of the energy of each of the different wavelength signals to a succeeding one of the reflective surfaces in a repeating pattern until substantially all of the energy of each of the different wavelength signals is reflected along said different length intermediate pathways.

41. The device of claim 40 in which said reflective stack is arranged for receiving the different wavelength signals as a plurality of parallel wavefronts and for transforming the plurality of parallel wavefronts into a plurality of relatively inclined wavefronts.

42. The device of claim 41 further comprising a focusing optic that transforms the relatively inclined wavelength signals into linearly distinguished wavelength signals aligned with said multiple pathways.

43. The device of claim 41 in which said partially reflective surfaces are inclined to non-zero angles of reflection along a direction of propagation between said single pathway and said reflective stack.

44. The device of claim 43 in which said single pathway is formed as a waveguide in a planar light guide.

45. The device of claim 44 in which said reflective stack is also formed in said planar light guide as a series of partially reflective surfaces oriented to said non-zero angles of reflection.

46. A method of angularly dispersing different wavelength signals comprising:

conveying the different wavelength signals along a common pathway to a multi-stage optical path length difference generator;

receiving the different wavelength signals at a first stage of the multi-stage optical path length difference generator as a plurality of parallel wavefronts having given amounts of energy;

diverting a portion of the energy throughout each of the parallel wavefronts from the common pathway to a first intermediate pathway;

conveying a remaining portion of the energy of each of the parallel wavefronts along the common pathway to a second stage of the multi-stage optical path length difference generator;

diverting a portion of the remaining energy throughout each of the parallel wavefronts from the common pathway to a second intermediate pathway;

repeating said steps of conveying and diverting succeeding portions of the remaining energy throughout each of the parallel wavefronts from the common pathway until substantially all of the energy of each of the parallel wavefronts has been diverted along additional intermediate pathways; and arranging the intermediate pathways in a sequence of progressively varying lengths for transforming the plurality of parallel wavefronts into a plurality of relatively inclined wavefronts.

47. The method of claim 46 including the further step of coupling the relatively inclined wavefronts to respective multiple pathways.

48. The method of claim 47 in which said coupling step includes focusing the relatively inclined wavefronts onto the respective multiple pathways.

49. The method of claim 46 in which said stages of the multi-stage optical path length difference generator include partially reflective surfaces.

50. The method of claim 49 in which said steps of diverting include partially reflecting portions of the energy throughout the parallel wavefronts from the common pathway to the respective intermediate pathways.

51. The method of claim 50 in which said steps of conveying the remaining portions of the energy include transmitting the remaining energy through the partially reflective surfaces.

52. The method of claim 51 in which said steps of conveying the remaining portions of the energy also include transmitting the remaining energy through refractive elements that separate the partially reflective surfaces.

53. The method of claim 51 including the further step of orienting the partially reflective surfaces parallel to each other at a non-zero angle of reflection along the common pathway.

54. The method of claim 53 including the further step of separating the partially reflective surfaces through a substantially constant distance.

55. The method of claim 51 including the further step of relatively adjusting the reflectivity of the partially reflective surfaces to control a distribution of energy among the intermediate pathways.

56. The method of claim 52 including the further step of arranging the partially reflective surfaces and the refractive elements in a stack so that the partially reflective surfaces overlap along the common pathway.

57. The method of claim 52 including the further step of adjusting refractive indices of the refractive elements for further controlling optical path lengths of the intermediate pathways.

58. The method of claim 57 in which said step of adjusting includes using an external control to adjust the refractive indices of the refractive elements.

59. The method of claim 58 in which said external control is one of temperature, pressure, electrical field, and magnetic field.

60. The method of claim 46 including the further step of tuning the multi-stage optical path length difference generator for adjusting the relative optical path lengths of the intermediate pathways.

61. A method of coupling a single pathway conveying a plurality of different wavelength signals with multiple pathways for separately conveying the different wavelength signals independently of mode field distributions of energy of the different wavelength signals comprising the steps of:

splitting a portion of the energy from multiple locations in the mode fields of each of the different wavelength signals between a common pathway and a first of a plurality of intermediate pathways;

diverting a remaining portion of the energy of each of the different wavelength signals from the common pathway to a second of the intermediate pathways;

successively diverting further remaining portions of the energy of each of the different wavelength signals from the common pathway to additional intermediate pathways until substantially all of the energy of each of the different wavelength signals has been diverted along the intermediate pathways; and dispersing the different wavelength signals conveyed by the intermediate pathways for separately coupling the different wavelength signals between the intermediate pathways and the multiple pathways.

62. The method of claim 61 in which said step of diverting includes diverting the remaining portion of the energy from multiple locations in the mode fields of each of the different wavelength signals.

63. The method of claim 62 in which said step of successively diverting includes successively diverting the further remaining portions of the energy from multiple locations in the mode fields of each of the different wavelength signals.

64. The method of claim 61 in which said step of splitting includes splitting a portion of the energy throughout the mode fields of each of the different wavelength signals.

65. The method of claim 64 in which said step of diverting includes diverting the remaining portion of the energy throughout the mode fields of each of the different wavelength signals.

66. The method of claim 65 in which said step of successively diverting includes successively diverting the further remaining portions of the energy throughout the mode fields of each of the different wavelength signals.

67. The method of claim 61 in which said step of splitting includes using a first partially reflective surface to reflect the portion of the energy of each of the different wavelength signals along the first intermediate pathway and to transmit the remaining portion of the energy of each of the different wavelength signals along the common pathway.

68. The method of claim 67 in which said step of diverting includes using a second partially reflective surface to reflect the remaining portion of the energy of each of the different wavelength signals along the second intermediate pathway and to transmit the further remaining portion of the energy of each of the different wavelength signals along the common pathway.

69. The method of claim 68 including the further step of relatively adjusting reflectivities of the first and second partially reflective surfaces to control a collective mode field distribution of the different wavelength signals conveyed by the intermediate pathways.

70. The method of claim 69 in which said collective mode field distribution is controlled to improve coupling efficiencies between the single and multiple pathways.

71. The method of claim 61 in which said step of dispersing includes forming the intermediate pathways with different optical path lengths.

72. The method of claim 71 in which said step of dispersing also includes arranging the different length intermediate pathways in a sequence of progressively varying lengths for relatively inclining wavefronts of the different wavelength signals.

* * * * *